US012786293B2

(12) United States Patent
Xue et al.

(10) Patent No.: US 12,786,293 B2
(45) Date of Patent: Nov. 3, 2026

(54) METHOD, DEVICE, AND COMPUTER PROGRAM PRODUCT FOR DOCUMENT TRANSMISSION

(71) Applicant: DELL PRODUCTS L.P., Round Rock, TX (US)

(72) Inventors: Yongbing Xue, Shanghai (CN); Min Liu, Shanghai (CN); Weiyang Liu, Shanghai (CN); Yuanyi Liu, Shanghai (CN); Mengze Liao, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 205 days.

(21) Appl. No.: 18/816,727

(22) Filed: Aug. 27, 2024

(65) Prior Publication Data

US 2024/0422246 A1 Dec. 19, 2024

Related U.S. Application Data

(62) Division of application No. 17/824,138, filed on May 25, 2022, now Pat. No. 12,107,941.

(30) Foreign Application Priority Data

Mar. 25, 2022 (CN) ........................ 202210309191.4

(51) Int. Cl.
*H04L 69/04* (2022.01)
*G06F 16/22* (2019.01)

(52) U.S. Cl.
CPC .......... *H04L 69/04* (2013.01); *G06F 16/2246* (2019.01); *G06F 16/2255* (2019.01)

(58) Field of Classification Search
CPC .................................................. G06F 16/2255
(Continued)

(56) References Cited

U.S. PATENT DOCUMENTS

2014/0143869 A1* 5/2014 Pereira .................. G06F 21/564 726/23
2015/0149208 A1* 5/2015 Lynch .................... G16H 10/60 705/3

(Continued)

FOREIGN PATENT DOCUMENTS

CN 100437562 C * 11/2008 ............. H04L 67/06

*Primary Examiner* — Sibte H Bukhari
(74) *Attorney, Agent, or Firm* — WOMBLE BOND DICKINSON (US) LLP

(57) ABSTRACT

Embodiments of the present disclosure relate to a method, a device, and a computer program product for document transmission. The method includes: selecting a portion to be encoded from a document that comprises structured portions, wherein each of the structured portions comprises an identifier and data associated with the identifier; acquiring at least one structured portion of the portion to be encoded; performing the following operations for a corresponding structured portion of the at least one structured portion to encode the document: generating a hash value of data of the corresponding structured portion; determining whether a hash value repository comprises the hash value; and replacing, based on a determination that the hash value repository comprises the hash value, the data of the corresponding structured portion in the document with the hash value; and sending the encoded document to a receiver.

20 Claims, 6 Drawing Sheets

(58) Field of Classification Search
USPC .......................................................... 709/247
See application file for complete search history.

(56) References Cited

U.S. PATENT DOCUMENTS

| | | | | |
|---|---|---|---|---|
| 2016/0036903 | A1* | 2/2016 | Pal | H04L 67/1087 709/213 |
| 2019/0171636 | A1* | 6/2019 | Jooste | G06F 11/3495 |

* cited by examiner

METHOD, DEVICE, AND COMPUTER PROGRAM PRODUCT FOR DOCUMENT TRANSMISSION

CROSS-REFERENCE TO RELATED APPLICATIONS

This application is a divisional of U.S. patent application Ser. No. 17/824,138, filed on May 25, 2022, which claims priority, under 35 U.S.C. § 119, of Chinese Patent Application No. 202210309191.4, filed Mar. 25, 2022, which are incorporated by reference in their entireties.

TECHNICAL FIELD

Embodiments of the present disclosure relate to document transmission technologies, and more specifically, to a method, a device, and a computer program product for transmitting a document including structured data.

BACKGROUND

In the management of a client device, in order to obtain the exact status of the client device, it is necessary to send (e.g., periodically) telemetry data reflecting various types of information on the client device from the client device to a backend of a service end. In conventional solutions, the client device typically sends to the backend a document (e.g., using a JSON format) including structured data, which contains all the predefined types of data needed for subsequent management of the client device. These documents are usually large in size and need to be sent at a high frequency. As a result, technical professionals are still looking for more efficient ways to transmit such telemetry data.

SUMMARY OF THE INVENTION

In a first aspect of the present disclosure, a method for document transmission is provided. The method includes: selecting a portion to be encoded from a document that comprises structured portions, wherein each of the structured portions comprises an identifier and data associated with the identifier; acquiring at least one structured portion of the portion to be encoded; performing the following operations for a corresponding structured portion of the at least one structured portion to encode the document: generating a hash value of data of the corresponding structured portion; determining whether a hash value repository comprises the hash value; and replacing, based on a determination that the hash value repository comprises the hash value, the data of the corresponding structured portion in the document with the hash value; and sending the encoded document to a receiver.

In a second aspect of the present disclosure, a method for document transmission is provided. The method includes: receiving from a sender a transmitted document that comprises structured portions, wherein each of the structured portions comprises an identifier and data associated with the identifier; selecting a portion to be decoded from the document; acquiring at least one structured portion of the portion to be decoded; and performing the following operations for a corresponding structured portion of the at least one structured portion: determining whether the corresponding structured portion comprises a valid hash value; and based on a determination that the corresponding structured portion comprises a valid hash value: determining whether a hash document repository comprises a corresponding entry of the valid hash value, wherein the corresponding entry stores data of a document portion and a hash value of the data, the hash value of the data being the same as the valid hash value; and replacing, based on a determination that the hash document repository comprises the corresponding entry, the valid hash value in the document with the data of the document portion.

In a third aspect of the present disclosure, an electronic device is provided. The electronic device includes: a processor; and a memory coupled to the processor, the memory having instructions stored therein that, when executed by the processor, cause the device to execute actions including: selecting a portion to be encoded from a document that comprises structured portions, wherein each of the structured portions comprises an identifier and data associated with the identifier; acquiring at least one structured portion of the portion to be encoded; performing the following operations for a corresponding structured portion of the at least one structured portion to encode the document: generating a hash value of data of the corresponding structured portion; determining whether a hash value repository comprises the hash value; and replacing, based on a determination that the hash value repository comprises the hash value, the data of the corresponding structured portion in the document with the hash value; and sending the encoded document to a receiver.

In a fourth aspect of the present disclosure, an electronic device is provided. The electronic device includes: a processor; and a memory coupled to the processor, the memory having instructions stored therein that, when executed by the processor, cause the device to execute actions including: receiving from a sender a transmitted document that comprises structured portions, wherein each of the structured portions comprises an identifier and data associated with the identifier; selecting a portion to be decoded from the document; acquiring at least one structured portion of the portion to be decoded; performing the following operations for a corresponding structured portion of the at least one structured portion: determining whether the corresponding structured portion comprises a valid hash value; and based on a determination that the corresponding structured portion comprises a valid hash value: determining whether a hash document repository comprises a corresponding entry of the valid hash value, wherein the corresponding entry stores data of a document portion and a hash value of the data, the hash value of the data being the same as the valid hash value; and replacing, based on a determination that the hash document repository comprises the corresponding entry, the valid hash value in the document with the data of the document portion.

In a fifth aspect of the present disclosure, a computer program product is provided. The computer program product is tangibly stored on a computer-readable medium and includes machine-executable instructions which, when executed, cause a machine to perform the method according to either the first aspect or the second aspect of the present disclosure.

It should be noted that the Summary of the Invention part is provided to introduce a selection of concepts in a simplified manner, which will be further described in the Detailed Description below. The Summary of the Invention part is neither intended to identify key features or major features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent, in which.

Throughout the drawings, the same or similar reference numerals represent the same or similar elements.

DETAILED DESCRIPTION

Figure 1:
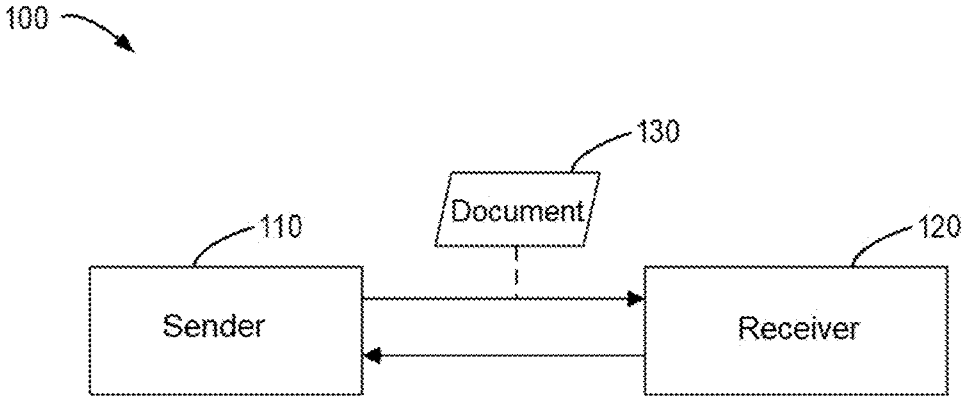
FIG. 1 illustrates a schematic diagram of example environment 100 in which multiple embodiments of the present disclosure can be implemented.

The embodiments of the present disclosure will be described in more detail below with reference to the accompanying drawings. Although some embodiments of the present disclosure are shown in the drawings, it should be understood that the present disclosure can be implemented in various forms, and should not be explained as being limited to the embodiments stated herein. Instead, these embodiments are provided for understanding the present disclosure more thoroughly and completely, and are not intended to limit the scope of protection of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

Collecting telemetry reports from a client device is an important way for a backend of a device or service provider to monitor and manage the client device and the applications thereon. These reports reflect relevant identifiers and various statuses of the client device as well as the applications thereon. With the development of device applications, data in more and more aspects needs to be collected. In conventional solutions, the client device typically sends to the backend a document (e.g., using a JSON format) including structured data, which contains the type of data the backend needs to monitor and manage the client device. These documents are typically large in size and need to be sent at a short time interval, which puts a great pressure on the network bandwidth, especially the uplink bandwidth of the client device. For example, if each telemetry report that needs to be sent is 10 MB in size and the client device sends a report once an hour, then the client device needs to send 240 MB of data per day for status monitoring, For the backend, receiving reports from 1000 client devices per day would generate 240 G of data.

Although the data content sent to the backend can be reduced, it may make the backend unable to obtain sufficiently comprehensive data to effectively manage the client device. On the other hand, reducing the frequency of sending these telemetry reports may reduce the immediacy of the telemetry reports received by the backend, so that the backend cannot obtain the latest changes of the client device in time and give feedback.

Since telemetry reports of the same type typically have a similar structure and contain partially the same content, some other approaches make the client device send only the part of each report that is different from the last report sent. However, this requires the client-side device to "remember" the content of the last report it sent and to compare each value in the report with the previous report, which consumes a lot of storage space and computational resources of the client terminal.

To at least partially solve these and other potential problems, embodiments of the present disclosure propose a solution for transmitting a document. This solution may retain the frequently changing structured portions of the sent document in the document and process the one or more structured portions of the remaining portions as they are sent and received. At the sender, the solution determines whether a portion is ever sent to the receiver by determining whether a hash value repository includes a hash value of data of that portion. If yes, before the document is sent, the hash value is used to replace that portion in the document. If no, the portion is retained in the sent document, and the hash value is stored in the hash value repository. At the receiver, the solution acquires corresponding one or more structured portions in the received document. If one of the structured portions does not include a valid hash value, the hash value of the data of that portion and the data are stored as an entry in the hash document repository. If a structured portion includes a valid hash value, the document is restored by replacing the hash value in the document with the data in the entry in the hash document repository that has the same hash value. If the hash document repository does not include a corresponding entry of a valid hash value, the receiver sends a notification to the sender indicating that the document needs to be resent.

In the above manner, the sender can de-duplicate the content of the transmitted document and no longer repeatedly send portions of the document that are known to the receiver. In this way, the actual size of the transmitted document can be significantly reduced while causing the receiver to obtain the same data content, thus saving resources such as time and bandwidth required to transmit the document. Since only the hash value needs to be calculated and stored at the sender side, this solution does not impose a large additional load on the sender with limited capacity and is easily portable to multiple devices. On the other hand, at the receiver which typically has more storage and computational resources, portions from a large number of historical documents can be stored, so that these portions do not need to be sent again by the sender. This solution can achieve a higher de-duplication rate than methods that only a limited number of reports are compared at the client device. This solution will be described below in the context of client device management. It should be understood, however, that this solution is also applicable in other scenarios where frequent transmission of documents including structured portions to the receiver is required.

FIG. 1 illustrates a schematic diagram of example environment 100 in which multiple embodiments of the present disclosure can be implemented. As shown in FIG. 1, example environment 100 includes sender 110 and receiver 120 of document 130. For example, sender 110 may be a client device that sends telemetry reports, and receiver 120 may be a service provider backend that manages and monitors the client device. Sender 110 and receiver 120 may also be any fixed or mobile devices.

Sender 110 may send multiple documents to receiver 120. For example, the client device may send telemetry reports reflecting the status of the client device to the backend at a certain frequency. At some point, sender 110 may need to send document 130 to receiver 120. Document 130 may contain structured data (e.g., data in JSON format). Sender 110 may process the content of document 130 and send processed document 130 to the receiver. Upon receipt of processed document 130, receiver 120 may perform various operations (e.g., parsing, data extraction, and analysis) on processed document 130, and/or may send processed document 130 to a downstream application or device. In addition, receiver 120 may also send information directly or indirectly to sender 110, for example, regarding the time interval at which the telemetry reports should be sent, the aspects that the data in the document should include, and so on.

It should be understood that the architecture and functions of example environment 100 are described for illustrative purposes only, and do not imply any limitation to the scope of the present disclosure. Sender 110 and receiver 120 may be a single device, a distributed device, or a device that exists in any other suitable form. Further, there may also be other devices, systems, or components that are not shown in example environment 100. For example, receiver 120 may receive documents from a plurality of different senders. In addition, the embodiments of the present disclosure may also be applied to other environments having different structures and/or functions.

Figure 2:
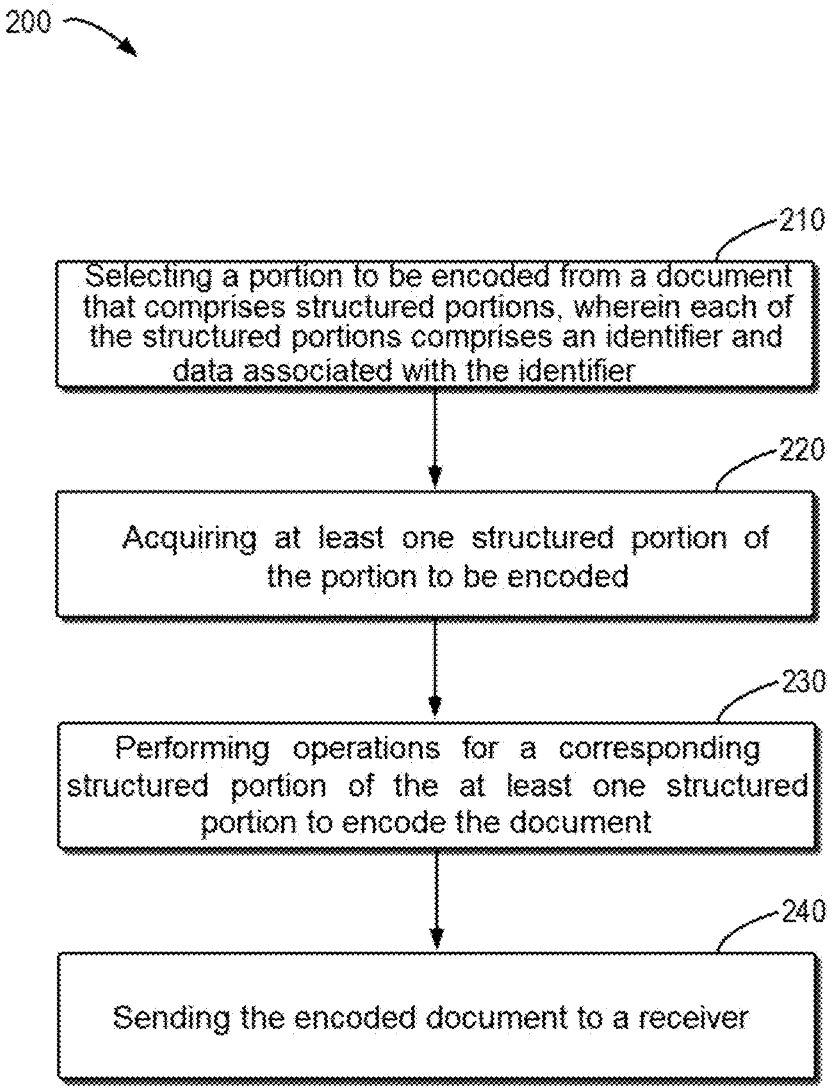
FIG. 2 illustrates example method 200 for transmitting a document according to some embodiments of the present disclosure.

FIG. 2 illustrates a flow chart of example method 200 for document transmission according to some embodiments of the present disclosure. Example method 200 may be executed, for example, by sender 110 as shown in FIG. 1. It should be understood that method 200 may also include additional actions not shown, and the scope of the present disclosure is not limited in this regard. Method 200 will be described in detail below with reference to FIG. 1.

At block 210, sender 110 selects a portion to be encoded from document 130, where document 130 includes structured portions, each of which includes an identifier and data associated with the identifier. By way of example, document 130 may be a structured document in a format such as JSON or XML, or otherwise include one or more identifiable structured portions. In some embodiments, document 130 may be a telemetry report on the status of a client device, which may be sent by the client device to a service backend that monitors and manages that client device.

In some embodiments, sender 110 may acquire one or more identifiers of one or more predefined structured portions. Then, sender 110 selects, based on the one or more identifiers, a portion in document 130 other than the one or more predefined structured portions as the portion to be encoded. Taking document 130 in JSON format as an example, the sender may acquire keys of one or more JSON fields (also referred to as entries) and select a portion in 130 other than the fields corresponding to the one or more keys as the portion to be encoded. Such identifiers may be acquired by sender 110 from receiver 120 or a third party when it needs to send document 130, may be stored locally in advance and read by sender 110 when needed, or may be acquired in any appropriate manner.

In some such embodiments, one or more predefined structured portions may be determined based on a frequency of changes in structured portions in a plurality of documents, a document in the plurality of documents including at least partially the same structure as document 130 (e.g., have partially the same field and/or hierarchical structure).

At block 220, sender 110 acquires at least one structured portion of the portion to be encoded. For example, sender 110 may acquire the at least one structured portion based on the identifier of the structured portion or the relative position of the structured portion in the entire document. In some embodiments, document 130 has a hierarchical tree structure (e.g., JSON format). In such embodiments, sender 110 may acquire a predefined encoding and decoding layer and take a structured partition of the portion to be encoded that is at the predefined encoding and decoding layer (e.g., a field of the JSON document that is at a certain layer) as the at least one structured portion. Sender 110 may acquire the encoding and decoding layer using a method similar to the method for acquiring the identifier of the predefined structured portion.

At block 230, sender 110 performs the following operations for a corresponding structured portion of the at least one structured portion to encode the document: generating a hash value of data of the corresponding structured portion; determining whether a hash value repository comprises the hash value; and replacing, based on a determination that the hash value repository comprises the hash value, the data of the corresponding structured portion in the document with the hash value. The hash value repository may, for example, be located locally at the client device. For example, sender 110 may use a predetermined hash algorithm to generate a hash value such that the same result is obtained when hash values are generated for the same data. In some embodiments, sender 110 stores the hash value in the hash value repository based on a determination that the hash value repository does not comprise the hash value.

After the structured portion that needs to be encoded has been encoded as described above, at block 240, sender 110 sends encoded document 130 to receiver 120. It should be understood that sender 110 may also continue to send additional documents to receiver 120 using method 200.

In some embodiments, sender 110 may also operate based on receipt of a notification from receiver 120, the notification indicating that encoded document 130 that has been sent includes at least one hash value that receiver 120 cannot process. In response to receiving the notification, sender 110 may remove the at least one hash value from the hash value repository. After removing the at least one hash value from the hash value repository, sender 110 may also re-encode document 130 in the same manner as previously described, and send re-encoded document 130 to the receiver. In this manner, data loss due to encoding errors or changes in data known to the receiver can be avoided.

Figure 3:
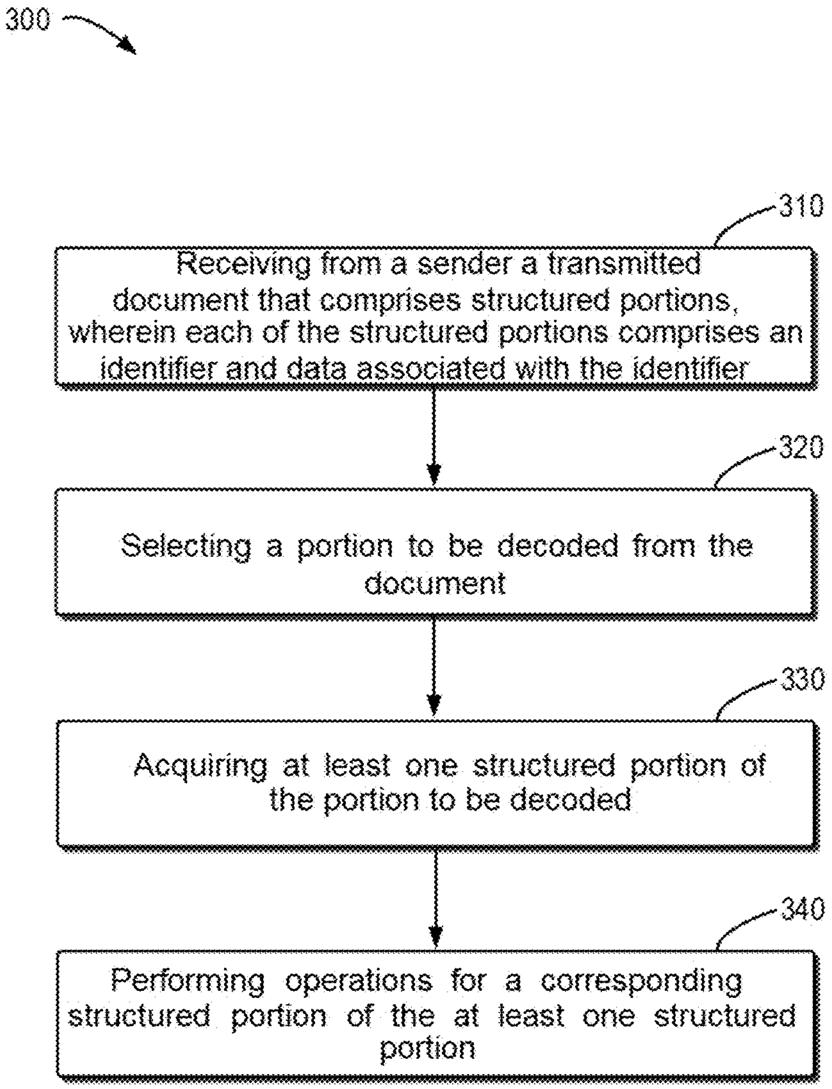
FIG. 3 illustrates example method 300 for processing a received transmitted document according to some embodiments of the present disclosure.

FIG. 3 illustrates a method for processing a received transmitted document according to some embodiments of the present disclosure. Example method 300 may be executed, for example, by receiver 120 as shown in FIG. 1. It should be understood that method 300 may also include additional actions not shown, and the scope of the present disclosure is not limited in this regard. Method 200 will be described in detail below with reference to FIG. 1.

At block 310, receiver 120 receives from sender 110 transmitted document 130 that includes structured portions, where each of the structured portions includes an identifier and data associated with the identifier. By way of example, document 130 may be a structured document in a format such as JSON or XML, or otherwise include one or more identifiable structured portions. For example, document 130 may be encoded document 130 that is sent by sender 110 to receiver 120 according to method 200. In some embodiments, document 130 may be a telemetry report on the status of a client device. A service backend that monitors and manages the client device may receive the telemetry report from the client device.

At block 320, receiver 120 selects a portion to be decoded from document 130. In some embodiments, receiver 120 may acquire one or more identifiers (such as keys of JSON fields) for one or more predefined structured portions. Receiver 120 then selects, based on the identifiers, a portion in document 130 other than the one or more predefined structured portions as the portion to be decoded. The identifiers may be, for example, predetermined and/or stored by receiver 120 and read when needed. In such example, receiver 120 may provide the identifiers to sender 110 for use (e.g., for use as the identifiers of the predefined structured portions in method 200). Receiver 120 may also acquire the identifiers in other appropriate ways or from a third party.

In some such embodiments, similar to the determination of the predefined structured portions in method 200, the one or more predefined structured portions here may be determined based on a frequency of changes in structured portions in a plurality of documents.

At block 330, receiver 120 acquires at least one structured portion of the portion to be decoded. For example, receiver 120 may acquire the at least one structured portion based on the identifier of the structured portion or the relative position of the structured portion in the entire document. In some embodiments, document 130 has a hierarchical tree structure (e.g., JSON format). In such embodiments, receiver 120 may acquire a predefined encoding and decoding layer and take a structured partition of the portion to be encoded that is at the predefined encoding and decoding layer (a field of the JSON document at a certain layer) as the at least one structured portion. Receiver 120 may acquire the encoding and decoding layer using a method similar to the method for acquiring the identifier of the predefined structured portion.

At block 340, receiver 120 performs the following operations for a corresponding structured portion of the at least one structured portion. First, receiver 120 determines whether the corresponding structured portion includes a valid hash value. Based on a determination that the corresponding structured portion includes a valid hash value, receiver 120 determines whether a hash document repository includes a corresponding entry of the valid hash value. The hash document repository may, for example, be located locally at receiver 120. The corresponding entry stores data of a document portion and a hash value of the data, and the hash value of the data is the same as the valid hash value. This means that the data represented by the valid hash value is the same as the data in the corresponding entry. Then, based on a determination that the hash document repository includes the corresponding entry, receiver 120 replaces the valid hash value in the document with the data of the document portion.

In some embodiments, based on a determination that the corresponding structured portion does not include a valid hash value, receiver 120 may generate a hash value of the data in the corresponding structured portion and add an entry to the hash document repository, where this entry stores the generated hash value and the data in the corresponding structured portion. For example, receiver 120 may use a predetermined hash algorithm to generate hash values such that the same result is obtained when hash values are generated for the same data.

After receiver 120 performs the above operations for all corresponding structured portions, the valid hash value in document 130 is restored to the data in the original document, and receiver 120 thereby obtains the complete original data in document 130. It should be understood that receiver 120 may also continue to use method 300 to process additional documents received from sender 110.

In some embodiments, based on a determination that the hash document repository does not include the corresponding entry of the determined at least one valid hash value, receiver 120 may also send a notification to sender 110, the notification indicating that the document includes the at least one valid hash value that cannot be processed. With this operation, receiver 120 can notify the sender of data that should be resent, thereby avoiding data loss due to the inability to restore the content of original data.

In some embodiments, method 300 and method 200 may be used in conjunction and performed by the receiver and the sender, respectively. In such embodiments, the one or more predefined structured portions acquired by sender 110 in method 200 may be the same as the one or more predefined structured portions acquired by receiver 120 in method 300. Further, the at least one structured portion encoded by sender 110 in 200 may be the same as the at least one predefined structured portion decoded by receiver 120 in method 300. For example, in embodiments where document 130 has a hierarchical structure, the predefined encoding layers acquired by sender 110 and receiver 120 in method 200 and method 300, respectively, may be the same. This ensures that sender 110 and receiver 120 perform hash value generation and content de-duplication for document 130 at the same granularity. In addition, sender 110 and receiver 120 may use the same hash algorithm to calculate hash values such that the calculation of hash values for the same data by both parties will generate the same hash value result. The hash algorithm may be accessible to both parties in any appropriate manner, and the scope of the present disclosure is not limited thereto.

Figure 4:
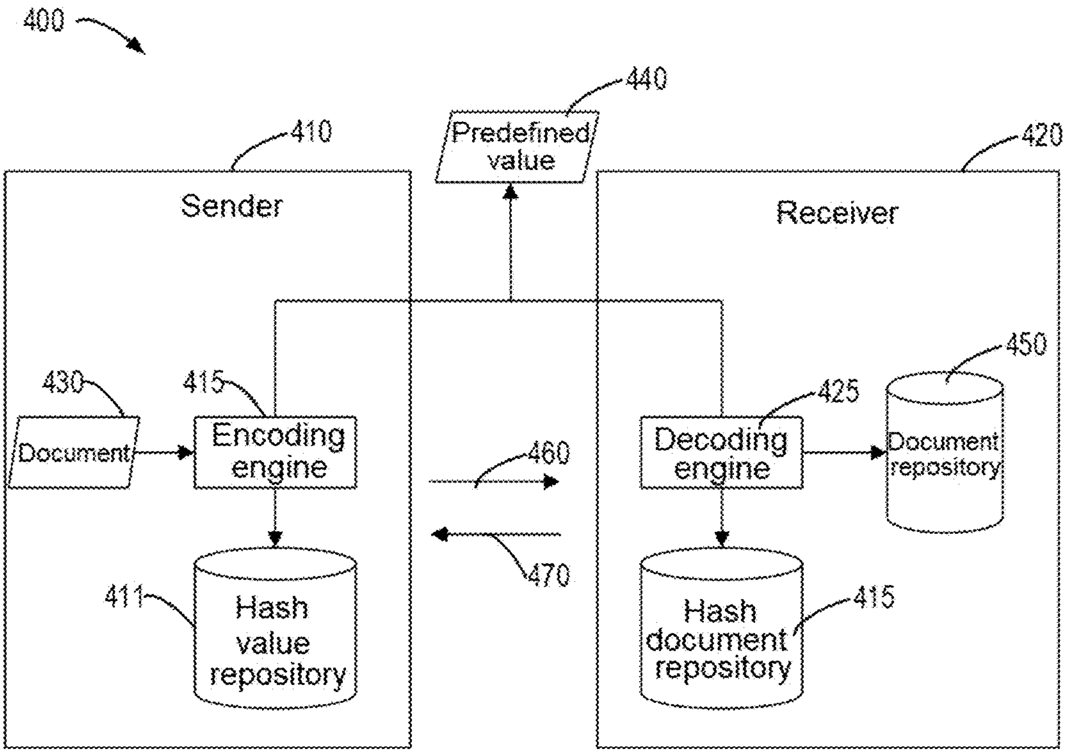
FIG. 4 illustrates example architecture 400 for transmitting a document according to some embodiments of the present disclosure.

FIG. 4 illustrates example architecture 400 according to some embodiments of the present disclosure, where an example implementation of sender 110 and an example implementation of receiver 120, i.e., sender 410 and receiver 420, are illustrated. In example architecture 400, for example, sender 410 may be a client device, while receiver 420 may be a backend of a device or service provider. As shown by arrow 460, sender 410 may send various data to receiver 420, for example, documents such as telemetry reports reflecting the status of the client device. It should be understood that the various devices, components, and their distribution in architecture 400 are only examples, and that other appropriate devices, components, and their distribution that are capable of performing the solution described in the present disclosure may also be used.

Document 430 may be document 130 in FIG. 1, which may be a telemetry report generated by a monitoring, statistical, or related application on the client device, such as the example first JSON document shown in Table 1 and the example second JSON document shown in Table 2. Architecture 400 will be described below using the documents in Table 1 and Table 3 as two examples of document 430. For the sake of clarity of illustration, some portions of these JSON documents are not shown in the tables and are indicated by ellipses.

TABLE 1

Example first JSON document

```
{
  "applianceInfo": {
    "ppdmIpAddress": "10.198.28.51",
    "port": 443;
            . . .
    "version": "19.10.0-1-SNAPSHOT"
    "components": [
          {
            "name": "POWER_PROTECT_DATA_MANAGER",
            "version": "10.10.0-1-SNAPSHOT"
          },
            . . .
      ]
      "upTimeInDays": "3",
      "timeZone": "PST8PDT - Pacific Standard Time",
      "secondaryDnsConfigured": false,
      "emailConfigured": false,
      "srsConfigured": false,
  },
  "licensing": {
    "licenseType"; "CAPACITY"
    "fetbLicensed": "50.0"
  }
}
```

In this example implementation, predefined value 440 is shown as separate from sender 410 and receiver 420. For example, predefined value 440 may be stored in a third party (not shown) that can communicate with sender 410 and/or receiver 420. In some other examples, encoding engine 415 of sender 410 may also acquire predefined value 440 from receiver 420. Predefined value 440 may include, for example, identifiers of one or more predefined structured portions and include an encoding and decoding layer in the case where document 430 has a hierarchical structure. In the following example description in conjunction with the documents in Tables 1 and 3, for purposes of illustration and not limitation, it is assumed that predefined value 440 includes the identifier "applianceInfo.upTimeInDays" of one or more predefined structured portions and an encoding and decoding layer of "1," and has no change throughout the example.

First, sender 410 will send the first JSON document in Table 1 to receiver 420. Based on the above values, encoding engine 415 of sender 410 selects the portion of the first JSON document that excludes the field "upTimeInDays" as the portion to be encoded. Further, encoding engine 415 acquires the partitions of the portion to be encoded that are at the first layer, i.e., "applianceInfo" and "licensing," as the structured portions to be encoded.

Encoding engine 415 then generates a hash value for the data other than "applianceInfo" in the first JSON document as follows:

5c41329ec6b9328cf8efb5112540f96b and generates a hash value for the data in "licensing" as follows:

b1073d8b27c705f4045dd13b0f3e6eea

Encoding engine 415 then checks whether hash value repository 411 includes the generated hash value. Assuming that no hash values are yet stored in this hash value repository 411, encoding engine 415 does not replace any portion of the first JSON document. Thus, the encoded first JSON document remains as shown in Table 1. Sender 410 sends the document to receiver 420.

Receiver 420 receives and decodes the encoded first JSON document as shown in Table 1. As previously described, decoding engine 425 of receiver 420 may read predefined value 440, for example, locally or from a third party. In this example, predefined value 440 includes the identifier "applianceInfo.upTimeInDays" of the one or more predefined structured portion and the encoding and decoding layer of "1."

Based on the above values, decoding engine 425 takes a portion in the first JSON document excluding the field "upTimeInDays" as the portion to be decoded, and acquires the partitions "applianceInfo" and "licensing" of the portion to be decoded that are at the first layer as the structured portions to be decoded. Then, decoding engine 425 determines whether these structured portions include a valid hash value.

Based on a determination that corresponding portions do not include a valid hash value, decoding engine 425 generates a hash value for the data in the "applianceInfo" of the first JSON document other than "upTimeInDays" as follows:

5c41329ec6b9328cf8efb5112540f96b and generates a hash value for the data in "licensing" as follows:

b1073d8b27c705f4045dd13b0f3e6eea

Assuming that no entry has been stored in hash document repository 421 at this point, then decoding engine 425 stores the above hash value and its corresponding data in an entry of hash document repository 421, as shown in Table 2. At this point, decoding engine 425 completes the processing of the encoded first JSON document and sends the processed document to a downstream application or device such as document repository 450. Document repository 450 may be, for example, a report data lake that stores historical telemetry reports received in the backend.

TABLE 2

Hash document entries stored based on the first JSON document

```
5c41329ec6b9328cf8efb5112540f96b  {
      "ppdmIpAddress": "10.198.28.51",
      "port": 443;
            ...
      "version": "19.10.0-1-SNAPSHOT"
      "components": [
        {
          "name":" POWER_PROTECT_DATA_MANAGER",
          "version": "10.10.0-1-SNAPSHOT"
            },
              ...
          ]
      "timeZone": "PST8PDT—Pacific Standard Time",
      "secondaryDnsConfigured": false,
      "emailConfigured": false,
      "srsConfigured": false,
```

TABLE 2-continued

Hash document entries stored based on the first JSON document

| Hash value | Data |
|---|---|
| | }, |
| b1073d8b27c705f4045dd13b0f3e6eea | { "licenseType": "CAPACITY", "fetbLicensed": "50.0" } |

In this example, after sender 410 processes and sends the first example JSON document, for example, after a predetermined time interval or in response to some trigger, sender 410 will send an example second JSON document as shown in Table 3 to the receiver. Here, encoding engine 415 generates a hash value for the data in the "applianceInfo" of the second JSON document other than "upTimeInDays" as follows, and determines whether the hash value has already been included in hash value repository 411:

5c41329ec6b9328cf8efb5112540f96b

TABLE 3

Example second JSON document

```
{
  "applianceInfo": {
    "ppdmIpAddress": "10.198.28.51",
    "port": 443;
          . . .
    "version": "19.10.0-1-SNAPSHOT"
    "components": [
        {
          "name": "POWER_PROTECT_DATA_MANAGER",
          "version": "10.10.0-1-SNAPSHOT"
        },
          . . .
    ]
    "upTimeInDays": "4",
    "timeZone": "PST8PDT - Pacific Standard Time",
    "secondaryDnsConfigured": false,
    "emailConfigured": false,
    "srsConfigured": false,
  }
  "licensing": {
    "licenseType": "CAPACITY",
    "fetbLicensed": "100.0"
  }
}
```

In this example, the hash value has already been included in hash value repository 411. This indicates that the same data as that of the corresponding portion has already been known to receiver 420. In this example, this is because the same data has previously been sent to receiver 420 in the first JSON document. Therefore, encoding engine 415 replaces the data in the corresponding portion of the second example JSON document (i.e., the data in "applianceInfo" other than "upTimeInDays") with the hash value without sending the complete data of that portion to receiver 420 again.

Encoding engine 415 generates a hash value for the data in the "licensing" of the second JSON document as follows, and determines whether the hash value has already been included in the hash value repository:

b0f607e28a886b05ca9ae0dadbbc1cb4

In this example, the hash value is not included in hash value repository 411. Therefore, sender 410 does not use the hash value to replace the data of the corresponding portion and stores the hash value in hash value repository 411.

At this point, encoding engine 415 completes the processing of the structured portion to be encoded of the second JSON document and obtains the encoded second JSON document, as shown in Table 4. Sender 410 then sends the encoded second JSON document to receiver 420. It should be understood that sender 410 may also continue to send additional documents to receiver 420 in a similar manner.

It should be noted that in this example, the "upTimeInDays" is excluded from the portion to be encoded of the document as a predefined structured portion. Thus, the data of this portion will be retained in the sent document, regardless of whether it has previously been sent to receiver 420.

Receiver 420 receives the encoded example second JSON document from sender 410. Here, decoding engine 425 of receiver 420 determines that the "applianceInfo" of the document includes a valid hash value, i.e., 5c41329ec6b9328cf8efb5112540f96b. Therefore, decoding engine 425 will determine whether the hash value is included in hash document repository 421.

TABLE 4

Encoded example second JSON document

```
{
  "applianceInfo": {
    "dellTelemetryEncoding": "5c41329ec6b9328cf8efb5112540f96b",
    "upTimeInDays": "4",
  },
  "licensing": {
    "licenseType": "CAPACITY"
    "fetbLicensed": "100.0"
  }
}
```

In this example, the hash value has already been stored in hash document repository 421 at the time when the first JSON document is received by receiver 420. Thus, decoding engine 425 replaces this hash value in the encoded second example JSON document with the data stored in the corresponding entry, thereby recovering the original data of the corresponding portion.

Decoding engine 425 also determines that the "licensing" portion of the encoded second JSON document does not include a valid hash value. Based on this determination, the receiver generates a hash value for the data of that portion and stores the hash value and the corresponding data in hash document repository 421, as shown in Table 5.

TABLE 5

Hash document entries stored based on the second JSON document

| Hash value | Data |
|---|---|
| b0f607e28a886b05ca9ae0dadbbc1cb4 | { "licenseType": "CAPACITY", "fetbLicensed": "100.0" } |

At this point, decoding engine 425 finishes the processing of the structured portion to be decoded of the encoded second JSON document and obtains the decoded second JSON document, as shown in Table 6. This document contains the same data as that in the second JSON document shown in FIG. 2. It should be understood that receiver 120 may also continue to process additional received documents in a similar manner.

TABLE 6

Decoded example second JSON document

```
{
  "applianceInfo": {
    "ppdmIpAddress": "10.198.28.51"
    "port": 443;
          . . .
    "version": "19.10.0-1-SNAPSHOT"
    "components": [
        {
          "name": "POWER_PROTECT_DATA_MANAGER".
          "version": "10.10.0-1-SNAPSHOT*
        },
          . . .
      ]
      "timeZone": "PSTBPDT - Pacific Standard Time",
      "secondaryDnsConfigured": false,
      "emailConfigured": false,
      "srsConfigured": false,
      "upTimeInDays": "4",
  },
  "licensing": {
    "licenseType": "CAPACITY",
    "fetbLicensed": "100.0"
  }
}
```

It should be noted that the file format and structure, identifier, encoding and decoding layer, etc., as well as associated values in the preceding examples, are examples only, and other suitable file formats and structures, fields, and encoding and decoding layers may also be used.

With the above method, the size of a document that needs to be sent can be significantly reduced (by more than 70% for some documents of the same type as the JSON document in the preceding example) without imposing a significant additional load on the sender and ensuring that the receiver obtains the same data, thus saving network resources.

The document received by receiver 420 from sender 410 may include at least one valid hash value that does not have a corresponding entry in hash document repository 421 due to, for example, an update of hash document repository 421 or an encoding error at sender 410. In such case, as part of the error handling mechanism, receiver 420 may send a notification to the sender, as indicated by arrow 470. The notification indicates that the encoded document 430 that has been sent includes the at least one valid hash value that cannot be processed by the receiver. In response to receiving the notification, receiver 420 may remove the at least one valid value from hash value repository 411. Thereafter, sender 410 may re-encode and send that document 430 to the receiver as indicated by arrow 460.

In some embodiments, receiver 420 may receive multiple structured documents of different types from multiple senders, and different predefined values 440 are defined for different types of documents. Decoding engine 425 may then acquire corresponding predefined value 440 for a specific type of documents. Similarly, sender 410 may also acquire corresponding predefined value 440 for a specific type of documents. For example, a field filter may be defined for each type of telemetry report sent by the client device to the backend, with each field filter including identifiers (such as JSON field keys) of one or more predefined structured portions. The field filter may be determined based on the analysis of a series of reports of the corresponding type.

Figure 5:
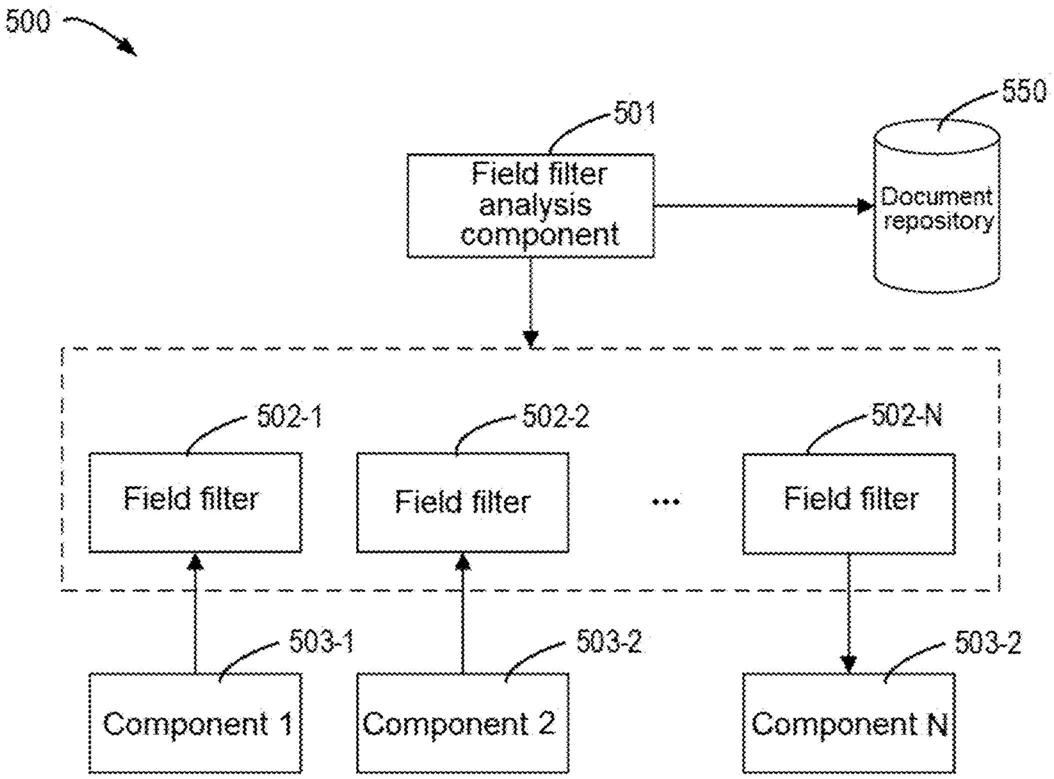
FIG. 5 illustrates example architecture 500 for determining a plurality of field filters according to some embodiments of the present disclosure, the field filter indicating one or more identifiers of one or more predefined structured portions.

FIG. 5 illustrates example architecture 500 for determining a plurality of field filters according to some embodiments of the present disclosure. Architecture 500 may, for example, be part of receiver 120 or receiver 420, and sender 110 or sender 410 may acquire the determined field filter in an appropriate manner. It should be understood that the components used to determine the field filter may also be distributed in other ways.

In FIG. 5, field analyzer component 501 may read a series of documents of the same type (e.g., the latest N telemetry reports of a specific type) from document repository 550 and analyze these documents. Document repository 550 may be, for example, document repository 450 in FIG. 4. Based on this analysis, field analyzer component 501 may define a field filter for that type, or update the corresponding defined field filter. For example, field analyzer component 501 may read the latest N reports of the same type and count the number of times the fields in these N reports have changed, and include in the field filter the fields that have changed for more than a threshold number of times. The field filter may also be determined based on more complicated analysis, and the solution of the present disclosure is not limited thereto. The defined plurality of field identifiers 502-1 through 502-M may then be used by corresponding components 503-1 through 503-M, where each field identifier is specific to a different document type. For example, components 503-1 through 503-M may be, for example, components for the transmission of corresponding types of documents, or other document management components according to embodiments of the present disclosure.

Figure 6:
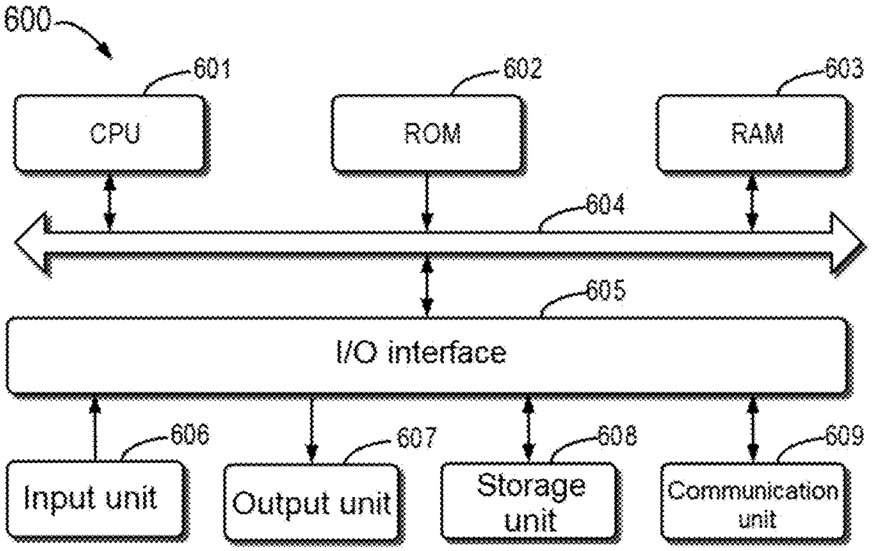
FIG. 6 illustrates a schematic block diagram of a device that may be used to implement embodiments of the present disclosure.

FIG. 6 illustrates a schematic block diagram of device 600 that may be used to implement embodiments of the present disclosure. Device 600 may be a device or apparatus as described in embodiments of the present disclosure, such as senders 110, 410 and receivers 120, 420, etc. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604. Although not shown in FIG. 6, device 600 may also include a co-processor.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by processing unit 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer programs are loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

What is claimed is:

1. A method for document transmission, comprising: receiving from a sender a transmitted document that comprises structured portions, wherein each of the structured portions comprises an identifier and data associated with the identifier; selecting a portion to be decoded from the document; acquiring at least one structured portion of the portion to be decoded; and performing following operations for a corresponding structured portion of the at least one structured portion: determining whether the corresponding structured portion comprises a valid hash value; and based on a determination that the corresponding structured portion comprises a valid hash value: determining whether a hash document repository comprises a corresponding entry of the valid hash value, wherein the corresponding entry stores data of a document portion and a hash value of the data, the hash value of the data being the same as the valid hash value, and replacing, based on a determination that the hash document repository comprises the corresponding entry, the valid hash value in the document with the data of the document portion.

2. The method according to claim 1, wherein the operations further comprise: based on a determination that the corresponding structured portion does not comprise a valid hash value: generating a hash value of data of the corresponding structured portion; and adding an entry to the hash document repository, the entry storing the generated hash value and the data of the corresponding structured portion.

3. The method according to claim 1, wherein selecting the portion to be decoded from the document comprises: acquiring one or more identifiers of one or more predefined structured portions; and selecting, based on the one or more identifiers, a portion in the document other than the one or more predefined structured portions as the portion to be decoded.

4. The method according to claim 3, wherein the one or more predefined structured portions are determined based on a frequency of changes in structured portions in a plurality of documents, a document in the plurality of documents comprising at least partially the same structure as the document.

5. The method according to claim 1, wherein the document has a hierarchical tree structure, and acquiring the at least one structured portion comprises: acquiring a predefined encoding and decoding layer; and taking a structured partition of the portion to be decoded that is at the predefined encoding and decoding layer as the at least one structured portion.

6. The method according to claim 1, further comprising: in response to determining that the hash document repository does not comprise a corresponding entry of the determined at least one valid hash value, sending a notification to the sender, the notification indicating that the document comprises at least one valid hash value that cannot be processed.

7. The method according to claim 1, wherein the document is a telemetry report on a status of a client device.

8. A data processing system, comprising: a processor; and a memory coupled to the processor to store instructions, which when executed by the processor, cause the processor to perform a method, the method comprising: receiving from a sender a transmitted document that comprises structured portions, wherein each of the structured portions comprises an identifier and data associated with the identifier; selecting a portion to be decoded from the document; acquiring at least one structured portion of the portion to be decoded; and performing following operations for a corresponding structured portion of the at least one structured portion: determining whether the corresponding structured portion comprises a valid hash value; and based on a determination that the corresponding structured portion comprises a valid hash value: determining whether a hash document repository comprises a corresponding entry of the valid hash value, wherein the corresponding entry stores data of a document portion and a hash value of the data, the hash value of the data being the same as the valid hash value, and replacing, based on a determination that the hash document repository comprises the corresponding entry, the valid hash value in the document with the data of the document portion.

9. The system according to claim 8, wherein the operations further comprise: based on a determination that the corresponding structured portion does not comprise a valid hash value: generating a hash value of data of the corresponding structured portion; and adding an entry to the hash document repository, the entry storing the generated hash value and the data of the corresponding structured portion.

10. The system according to claim 8, wherein selecting the portion to be decoded from the document comprises: acquiring one or more identifiers of one or more predefined structured portions; and selecting, based on the one or more identifiers, a portion in the document other than the one or more predefined structured portions as the portion to be decoded.

11. The system according to claim 10, wherein the one or more predefined structured portions are determined based on a frequency of changes in structured portions in a plurality of documents, a document in the plurality of documents comprising at least partially the same structure as the document.

12. The system according to claim 8, wherein the document has a hierarchical tree structure, and acquiring the at least one structured portion comprises: acquiring a predefined encoding and decoding layer; and taking a structured partition of the portion to be decoded that is at the predefined encoding and decoding layer as the at least one structured portion.

13. The system according to claim 8, wherein the method further comprises: in response to determining that the hash document repository does not comprise a corresponding entry of the determined at least one valid hash value, sending a notification to the sender, the notification indicating that the document comprises at least one valid hash value that cannot be processed.

14. The system according to claim 8, wherein the document is a telemetry report on a status of a client device.

15. A non-transitory machine-readable medium having instructions stored therein, which when executed by a processor, cause the processor to perform a method, the method comprising: receiving from a sender a transmitted document that comprises structured portions, wherein each of the structured portions comprises an identifier and data associated with the identifier; selecting a portion to be decoded from the document; acquiring at least one structured portion of the portion to be decoded; and performing following operations for a corresponding structured portion of the at least one structured portion: determining whether the corresponding structured portion comprises a valid hash value; and based on a determination that the corresponding structured portion comprises a valid hash value: determining whether a hash document repository comprises a corresponding entry of the valid hash value, wherein the corresponding entry stores data of a document portion and a hash value of the data, the hash value of the data being the same as the valid hash value, and replacing, based on a determination that the hash document repository comprises the corresponding entry, the valid hash value in the document with the data of the document portion.

16. The machine-readable medium according to claim 15, wherein the operations further comprise: based on a determination that the corresponding structured portion does not comprise a valid hash value: generating a hash value of data of the corresponding structured portion; and adding an entry to the hash document repository, the entry storing the generated hash value and the data of the corresponding structured portion.

17. The machine-readable medium according to claim 15, wherein selecting the portion to be decoded from the document comprises: acquiring one or more identifiers of one or more predefined structured portions; and selecting, based on the one or more identifiers, a portion in the document other than the one or more predefined structured portions as the portion to be decoded.

18. The machine-readable medium according to claim 17, wherein the one or more predefined structured portions are determined based on a frequency of changes in structured portions in a plurality of documents, a document in the plurality of documents comprising at least partially the same structure as the document.

19. The machine-readable medium according to claim 15, wherein the document has a hierarchical tree structure, and acquiring the at least one structured portion comprises: acquiring a predefined encoding and decoding layer; and taking a structured partition of the portion to be decoded that is at the predefined encoding and decoding layer as the at least one structured portion.

20. The machine-readable medium according to claim 15, wherein the method further comprises: in response to determining that the hash document repository does not comprise a corresponding entry of the determined at least one valid hash value, sending a notification to the sender, the notification indicating that the document comprises at least one valid hash value that cannot be processed.

* * * * *